Oct. 30, 1923.

J. WEGNER ET AL

CUTTING DEVICE

Filed Dec. 24, 1921

1,472,261

5 Sheets-Sheet 1

INVENTORS

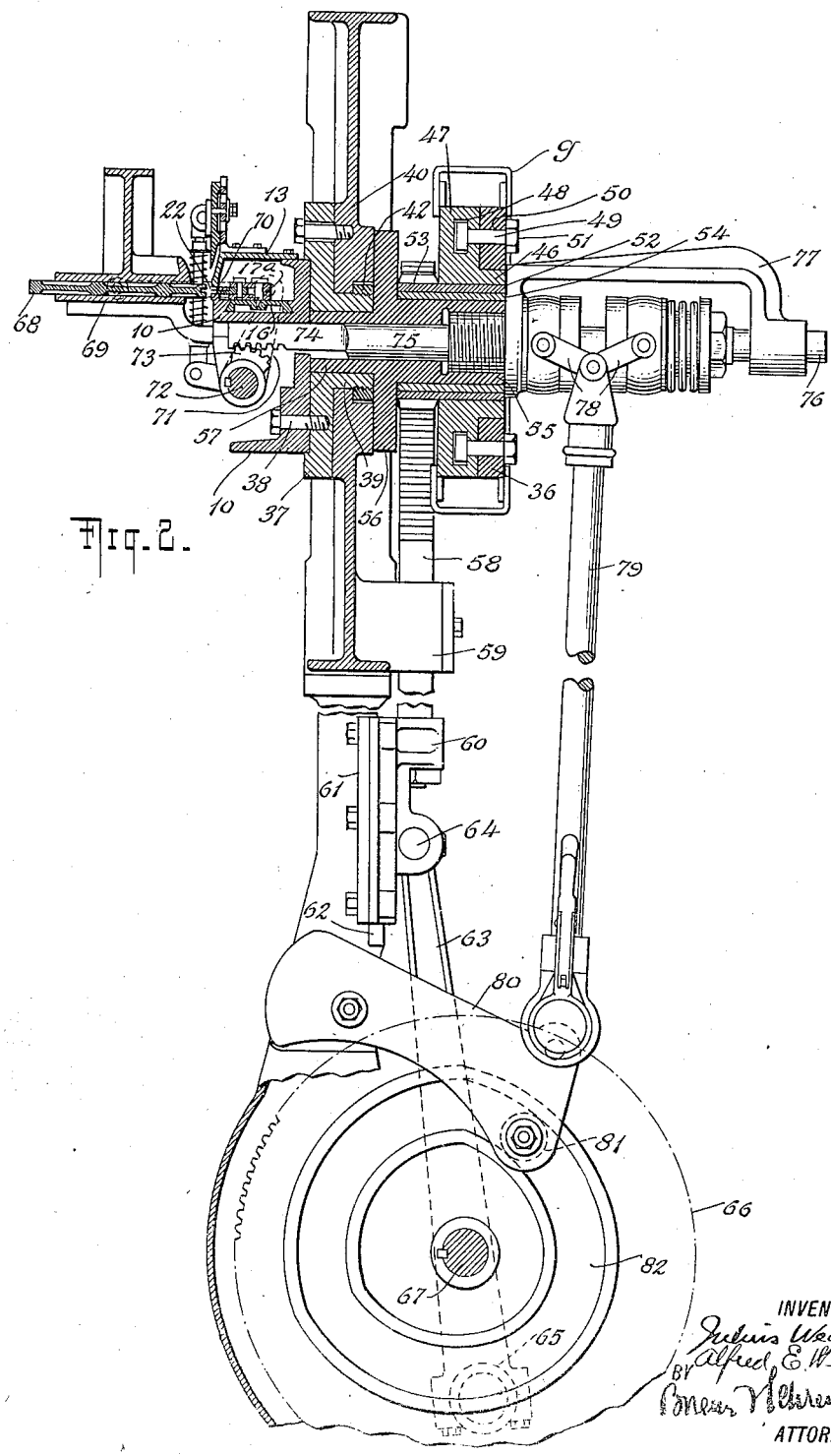

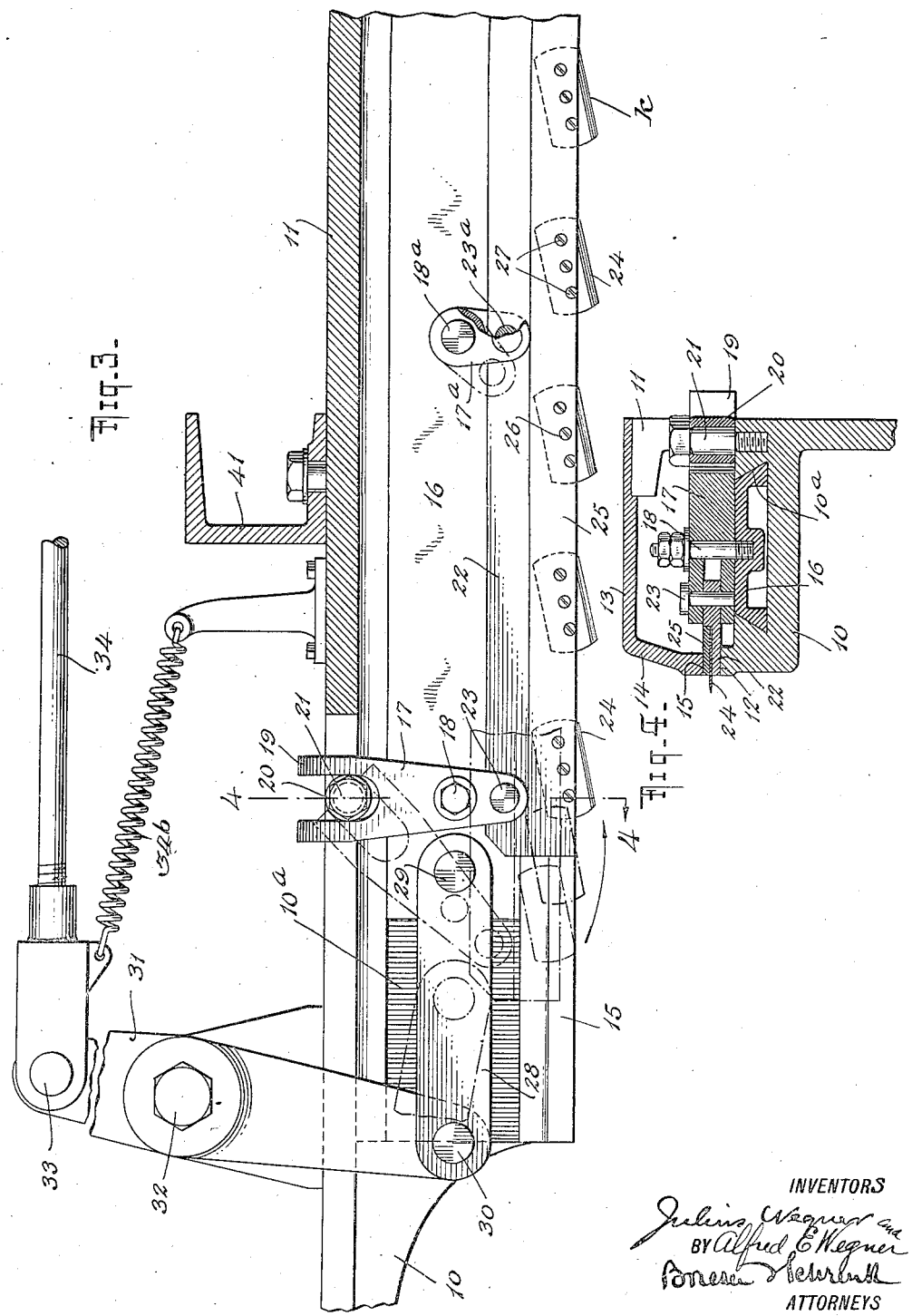

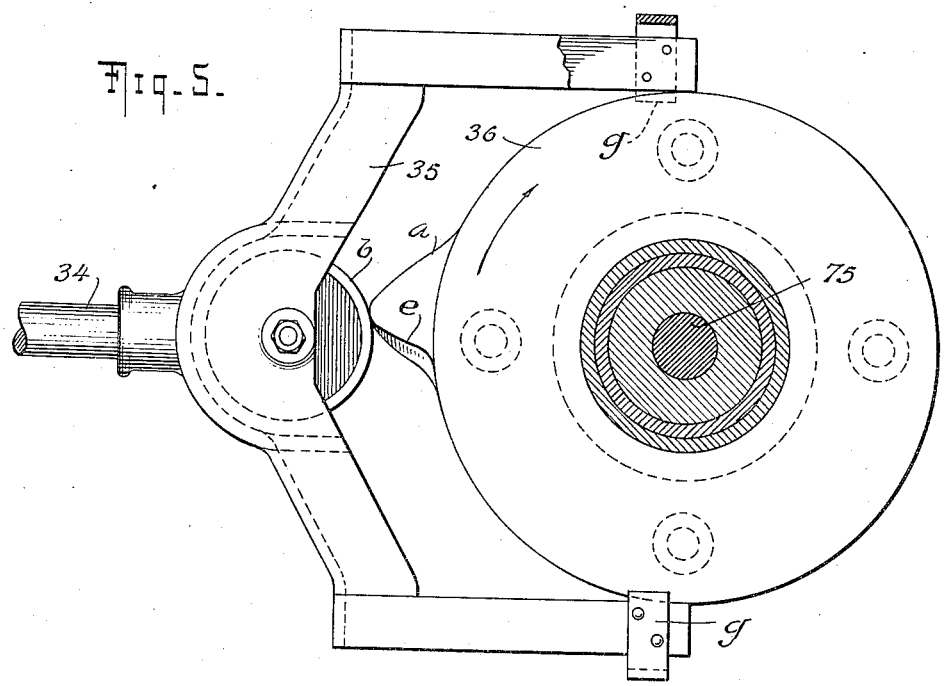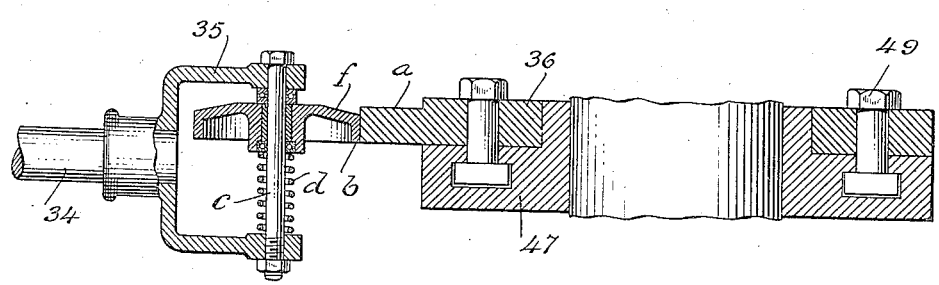

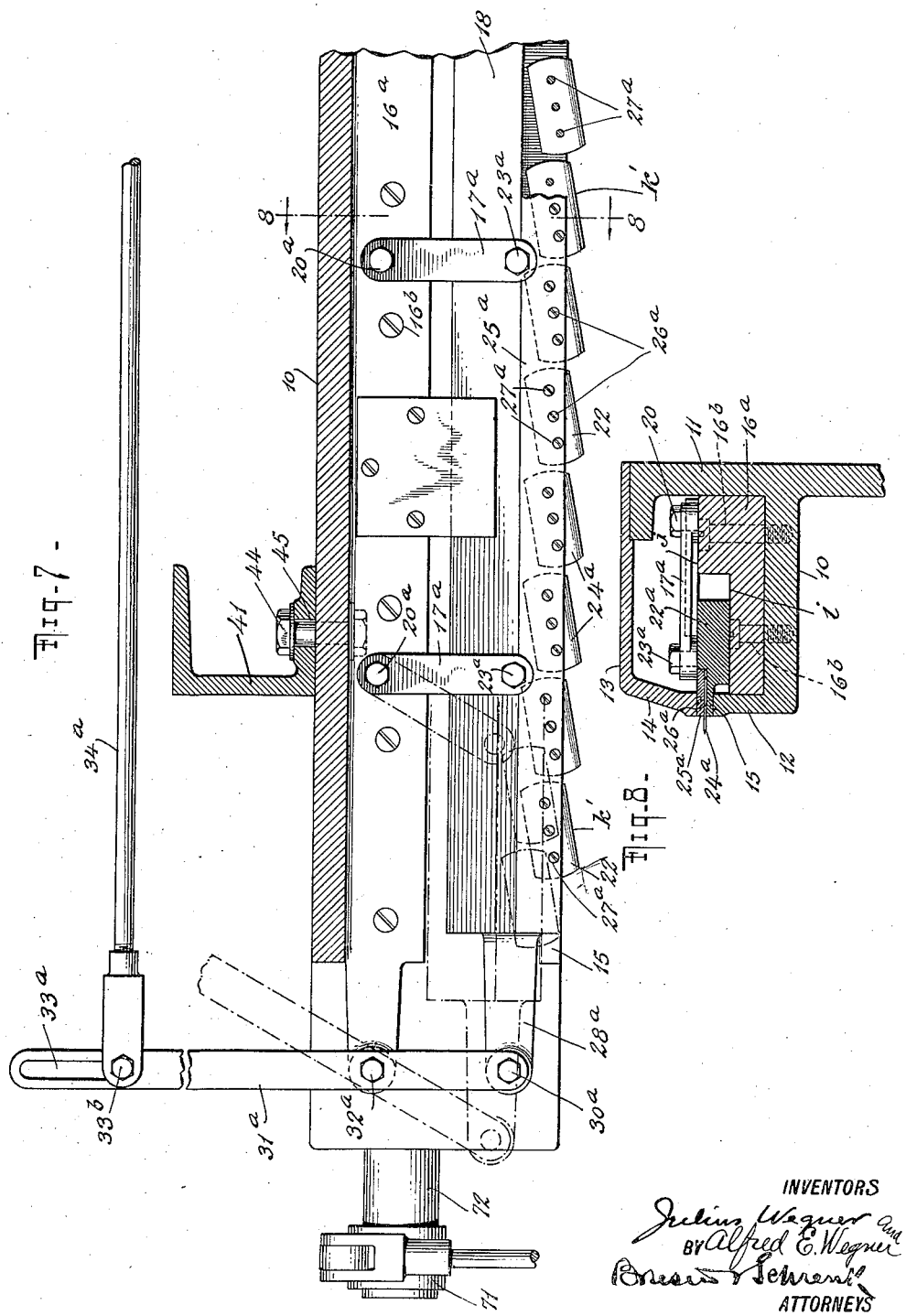

Patented Oct. 30, 1923.

1,472,261

UNITED STATES PATENT OFFICE.

JULIUS WEGNER AND ALFRED E. WEGNER, OF NEW YORK, N. Y., ASSIGNORS TO SPADONE MACHINE CO., OF NEW YORK, N. Y., A COPARTNERSHIP CONSISTING OF HENRY SPADONE AND WALTER W. SPADONE.

CUTTING DEVICE.

Application filed December 24, 1921. Serial No. 524,804.

*To all whom it may concern:*

Be it known that we, JULIUS WEGNER, a citizen of the United States of America, and ALFRED E. WEGNER, a citizen of Poland, and both residents of the borough and county of Queens, city and State of New York, have invented certain new and useful Improvements in Cutting Devices, of which the following is a specification.

Our invention relates to mechanically operated cutting devices and has for its object to provide a novel and simplified cutting means whereby the cutting operation is efficiently performed. A further object of our invention is to construct and operate said cutting means in a manner adapting it specially for operative combination with machines in which the material to be cut is automatically fed and so as to permit a maximum feed of material between cuts. The invention will be fully described hereinafter and the features of novelty will be pointed out in the appended claims.

Figure 1:
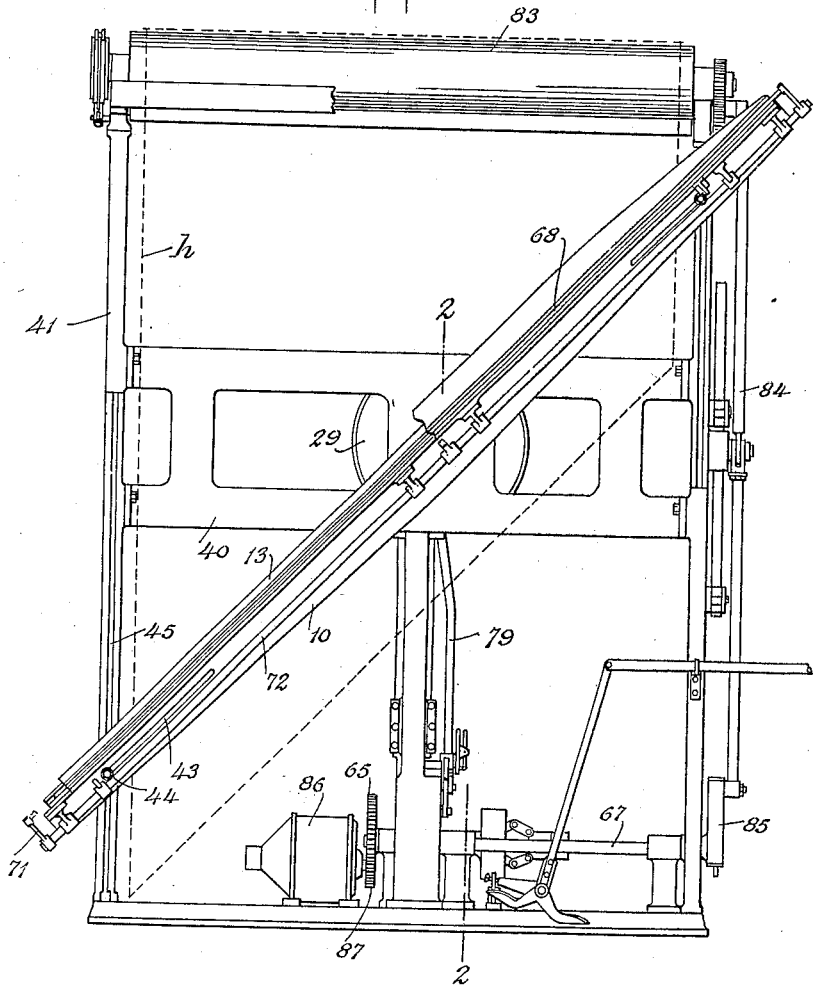
Figure 9:
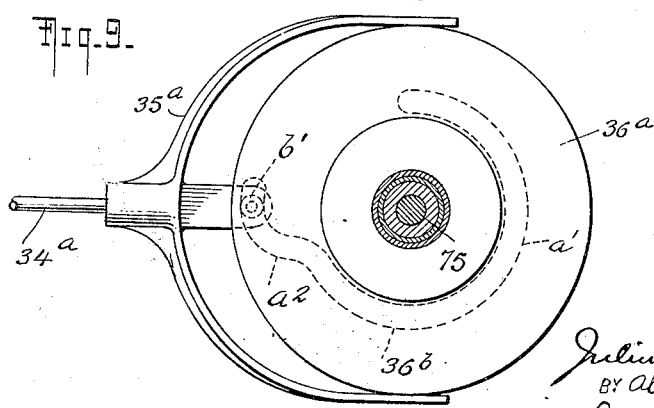

In the accompanying drawings, which illustrate a specific embodiment of the invention and an example of its installation without defining the limits thereof, Figure 1 is a front elevation of a fabric-cutting machine with our invention embodied therein; Fig. 2 is a detailed vertical section on an enlarged scale approximately on the line 2—2 of Fig. 1; Fig. 3 is a sectional plan of the cutting device in one form; Fig. 4 is a cross-section thereof on the line 4—4 of Fig. 3; Figs. 5 and 6 are detail views illustrating an example of the means whereby the cutting device is operated; Fig. 7 is a sectional plan of another form of cutting device; Fig. 8 is a cross-section thereof on the line 8—8 of Fig. 7, and Fig. 9 is a detail view of another form of operating means for the cutting device.

In the form shown in Figs. 3 and 4, the cutting device comprises a support 10 which preferably comprises a beam having a rear flange 11 and a front flange 12; a cover 13 is secured in any suitable manner upon the rear flange 11 and includes a flange 14 which, together with the front flange 12, forms a slot 15 extending lengthwise of the beam, as shown in Fig. 3. The beam 10, in the form being described, is provided with a preferably undercut groove $10^a$ extending lengthwise thereof and in which a slide 16 is slidably fitted; links 17 are pivotally connected at 18 with said slide 16 and at one end are formed with forks 19 which project over rollers 20 rotatably mounted on stationary studs 21 fixed upon the support 10 at proper points. The opposite ends of the links 17 are inwardly slotted for the reception of a carrying member 22 and are pivotally connected to said member at 23. In the preferred arrangement additional links $17^a$ are located at spaced intervals along the slide 16 to which they are pivoted at $18^a$, the member 22 being also fitted into the slotted ends of said links $17^a$ and being pivoted thereto at $23^a$; in some cases these additional links $17^a$ may be omitted. The active cutting elements comprise a plurality of cutting blades or members 24 which are secured upon the carrying member 22 at spaced intervals and fixed thereon in any suitable manner as by means of a clamping bar 25 secured in place through the medium of screws 26. The cutting blades 24 preferably are provided with duplicate cutting edges so as to be reversible and occupy an inclined position with respect to the longitudinal free edge of the carrying member 22 and clamping bar 25, as shown in Fig. 3. The arrangement is such that the active cutting edge of each cutting blade 24 is located beyond the free edges of the carrying member 22 and clamping bar 25 and extends at an angle thereto, as illustrated in Fig. 3. The cutting blades 24 may be held in their intended positions by means of screws 27 and are so located with respect to each other that the cuts of contiguous cutting members overlap and run into each other to form one continuous cut transverse to the material, as will appear more fully hereinafter.

In practice, the slide 16 is reciprocated in the groove $10^a$ by means of suitable mechanism properly timed with the apparatus of which the cutting device forms a part; in the illustrated example this mechanism comprises a link 28 pivotally connected at 29 with the slide 16 and at 30 with a lever 31 which itself is pivoted at 32 upon a stationary part of the support 10. Any convenient means may be provided for rocking the lever 31 on its pivot 32; for instance, said lever 31 may be connected at 33 with a rod 34 which terminates in a yoke 35. The latter embraces a cam 36 having a cam nose *a* arranged to engage a roller *b* rotatably mounted upon the yoke 35; the nose *a* is of such shape and dimensions that the actual cutting movement and the movement of recovery will be short and rapid, as will be more fully explained hereinafter. In apparatus in which the cam 36, instead of being rotated continuously in one direction, is rocked back and forth, as would be the case in cutting machines of the type shown in the Julius Wegner Patent No. 1,384,984 of July 19, 1921, it is desirous, sometimes, to have the cam nose *a* act upon the roller *b* to effect a cutting action only during a movement of said cam in one direction and to be ineffective with respect thereto during the movement of said cam in the opposite direction. In the illustrated example this is accomplished by loosely mounting the roller *b* upon an axle *c* carried by the yoke 35; the roller *b* is thus capable of sliding lengthwise of the axle and is maintained in position for engagement with the cam nose *a* by means of a spring *d*. The cam nose *a* is formed with a bevel *e* which co-operates with a bevel *f* of the roller *b* to force the latter against the tension of the spring *d* and out of the path of the nose *a* during a return movement of the cam 36, as will appear more fully hereinafter. In the preferred arrangement the yoke 35 may be provided with lugs *g* adapted to project beyond the periphery of the cam 36 to maintain the fork against lateral displacement relatively to said cam.

For the purpose of illustrating a practical installation of our invention, we have chosen to show the same in operative combination with a machine for cutting fabric of the type disclosed in Patent No. 1,384,984 previously referred to, it being understood that this is not to be taken as defining the limits of usefulness of the invention in any sense.

In such case, the beam 10 may be secured upon a locator 37 by means of one or more bolts 38, said locator having a neck 39 fitted into an opening in a cross-brace 40 forming part of a frame 41; the neck 39 may be screw-threaded for the accommodation of a lock-nut 42 whereby the locator and with it the beam 10 is fixed in an adjusted position. To still more securely lock the beam 10 in an adjusted position, it may be provided near its opposite ends with longitudinal slots 43 through which bolts 44 project, the heads of said bolts being slidable in vertical grooves 45 formed in the upright side members of the frame 41. As illustrated in Fig. 2, the cam 36 is fitted upon the tubular neck 46 of a disk 47, which is provided with an annular slot 48 of T-shape in cross-section; T-head bolts 49 are located in said slot 48 and project beyond the same through suitable holes 50 in the cam 36 and, in combination with nuts 51, serve to securely fasten the cam 36 on said disk 47. The latter is keyed upon the tubular sleeve 52 of a drive pinion 53 to rotate therewith, said pinion, in turn, being rotatably mounted upon a bushing 54 located upon the pivot member 55 of a pivot plate 56 which is fastened to the rear face of the cross-brace 40. The pivot plate 56 is provided with an axial extension 57 which fits into the axial bore of the neck 39 of the locator 37 and projects forwardly therein toward the beam 10, as shown in Fig. 2. The pinion 53 is in mesh with a vertically reciprocating rack 58 slidably mounted in a guide 59 carried by the cross-brace 40 and connected at its lower end with a cross-head 60 having vertical guideways formed by plates 61 attached to said cross-head. The latter is vertically movable on a slide member 62 which fits into said guideways and is located upon the base of the frame 41. A connecting rod 63 is pivotally connected at 64 with the cross-head 60 and at 65 with a gear 66 which is secured upon a shaft 67.

A clamping bar 68 for clamping the fabric against the beam 10 during the cutting operation is slidably mounted in a support 69 and is operated by means of members 70 connected with levers 71 carried by a shaft 72, which is mounted upon and extends lengthwise of the beam 10. The shaft 72 also carries a toothed sector 73 which meshes with a rack 74; the latter comprises a part of a rod 75 slidably mounted within the common bore of the extension 57 and pivot member 55 and is formed with a reduced end 76 slidably mounted in a stationary bracket 77 fixed upon the frame 41. The rod 75 is reciprocated to operate the clamping bar 68 at the proper time, by means of toggles 78 and a bar 79 connected therewith, the latter, in turn, being connected with a rocking member 80. A roller 81 is mounted upon the rocking member 80 and co-operates with a cam 82 to reciprocate the bar 79 and thereby actuate the toggles 78; the cam 82 is secured upon the shaft 67.

The fabric or other material *h* to be cut is fed in predetermined steps at intervals by means of a feed roller 83 journalled upon the frame 41 and operated by means of suitable mechanism 84 connected with a crank-member 85 also mounted upon the shaft 67. The latter may be actuated in any convenient manner, as by means of an electric motor 86 and gearing 87 operatively connected with the gear 65, and is preferably adjustable in any convenient manner to vary the steps in which the material *h* is fed and thereby to vary the dimensions of the cut sections of material in accordance with predetermined desires.

form the slide 16 is replaced by a filler piece 16$^a$ which may be secured upon the beam 10 between the flanges 11 and 12 in any suitable manner, as by means of screws 16$^b$, and is preferably step-shaped in cross-section to provide surfaces $i$ and $j$ at different levels. It will be understood that the filler piece 16$^a$ may be omitted and that the support 10 itself may be properly shaped to include the surfaces $i$ and $j$. A carrying member 22$^a$ is mounted in surface engagement with the surface $i$ and is of such dimensions that its outer surface lies flush with the surface $j$. A plurality of links 17$^a$ have one end pivotally connected at 20$^a$ with the filler piece 16$^a$ and the other end pivotally connected at 23$^a$ with the carrying member 22$^a$. The active cutting elements comprise a plurality of cutting blades or members 24$^a$ which are secured upon the carrying member 22$^a$ and fixed thereon in any suitable manner, as by means of a clamping bar 25$^a$ secured in place through the medium of screws 26$^a$. The cutting blades 24, in this form, also are preferably provided with duplicate cutting edges so as to be reversible and in practice also occupy an inclined position with respect to the longitudinal free edge of the clamping bar 25$^a$, the arrangement being also such that the active cutting edge of each cutting member 24$^a$ is located beyond the free edges of the carrying member 22$^a$ and clamping bar 25$^a$ and at an angle thereto, as illustrated in Fig. 7. The cutting members 24$^a$ may be held in their intended positions by means of screws 27$^a$ in the same way as in the form first described and are also so located with respect to each other that the cuts of contiguous cutting members overlap and run into each other to form one continuous cut transverse to the fabric or other material, as will appear more fully hereinafter. In practice, with the arrangement set forth, the carrying member 22$^a$ is reciprocated in circular arcs having the pivots 20$^a$ as centres and thereby moves the cutting devices 24$^a$ in individual arcs which pass through or intersect the plane in which the fabric to be cut is supported, the direction of the arcs referred to being in the direction of the cut and back again or in the present instance transverse to the direction of travel of the fabric or other material to be cut. Any suitable means may be provided for actuating the carrying member and cutting devices in the described manner; for instance as shown in Fig. 7, the carrying member may be provided at one end with a lug 28$^a$ comprising an integral extension thereof or secured thereto and pivotally connected at 30$^a$ with one end of a lever 31$^a$. The latter is pivoted at 32$^a$ upon a stationary lug which, as shown in Fig. 7, may comprise an integral extension of the filler piece 16$^a$, the arrangement being such that the pivots 30$^a$ and 32$^a$ are located in lineal registry with the pivots 20$^a$ and 23$^a$, so that the distance between the pivots 30$^a$ and 32$^a$ corresponds to the distance between the pivots 20$^a$ and 23$^a$. The lever 31$^a$ receives a rocking movement through the medium of a cam 36$^a$ having a cam slot 36$^b$ in which a roller $b'$ is adapted to travel, said roller being carried by a yoke 35$^a$; the latter embraces the cam 36$^a$, which thus serves to guide said yoke in the reciprocable movements imparted thereto by the roller $b'$ through the medium of the cam slot 36$^b$. The latter preferably includes a concentric major section $a'$ and an off-set minor section $a^2$ or is otherwise so shaped that for the major portion of the operative movements of said cam 36$^a$ the roller $b'$ and its associated parts will remain stationary so far as reciprocable motion is concerned, and will then be given a rapid forward and backward movement. The yoke 35$^a$ is connected by means of a rod 34$^a$ with the lever 31$^a$, the latter preferably being provided with a slot 33$^a$ for the reception of a bolt 33$^b$ whereby the connection is effected and adjustment thereof is possible.

When used in combination with a cutting machine of the type illustrated in Figs. 1 and 2, the cutting device may be combined therewith in the manner previously indicated with respect to the form first described and indicated diagrammatically in Fig. 1. In practice, as the machine is set in motion, with this form of the invention embodied therein, the cam 36$^a$ will be rocked in one direction, for instance, by means of the rack 58, slide 60, and connecting rod 63; this will finally cause the roller $b'$ to pass from the section $a'$ of the cam groove 36$^b$ to the section $a^2$ thereof and accordingly will cause a push to be exerted upon the yoke 35$^a$ whereby the latter is moved in a direction away from the cam's periphery. This movement of said yoke is communicated to the rod 34$^a$ which, in turn, swings the lever 31$^a$ upon its pivot 32$^a$ from the dotted position in Fig. 7 to the position shown in full lines therein, whereby a pushing force to the right in Fig. 7 is exerted upon the carrying member 22$^a$. Because of the link connections 17$^a$, this causes said member to move from the dotted line position to the full line position in Fig. 7 and actuates the cutting means in a circular arc which passes through or intersects the plane in which the material $h$ is supported from the roller 83; in the specific illustration, the described operation of the member 22$^a$ causes each cutting blade 24$^a$ to move in its own arc which passes through the aforesaid plane of the material $h$. Because of the inclina- In practice, the beam 10 is adjusted to the angle of which the fabric or other material $h$ is to be cut, for instance, as illustrated in Fig. 1, and fixed in this position by means of the bolts 44; the fabric $h$ is then brought over the feed roller 83 and caused to depend therefrom between the clamping member 68 and the front flanges 12 and 14 of the cutting means, so as to extend across the slot 15 thereof. As the machine is now set in motion, the cam 36 will be rocked by means of the rack 58, slide 60 and connecting rod 63 in the direction indicated by the arrow in Fig. 5; this will finally cause the nose $a$ of the cam 36 to engage the roller $b$ and consequently will cause a push to be exerted upon the yoke 35 whereby the latter is moved in a direction away from the periphery of the cam 36. This brings about a corresponding movement of the rod 34 which, in turn, swings the lever 31 upon its pivot 32 and slidably moves the slide 16 to the right in Fig. 3 from the dotted position to the full line position therein; the described actuation of said slide 16 carries with it the pivots 18 of the links 17 and, because of the forked connection of the latter with the rollers 20, causes said links to describe pivotal movements, which are communicated to the carrying member 22 and swing the same outwardly whereby the cutting blades 24 are operated in the cutting direction. Because of the compound sliding and pivotal movement imparted to the carrying member 22 by the action of the slide 16 and the links 17 in co-operation with the rollers 20, the cutting blades 24 are caused to describe relatively shallow and long curves which pass through the plane of the fabric or other material $h$ in directions transverse to the feeding movement of said fabric. Because of this fact and owing to the inclination of the active cutting edges $k$ of said blades 24 with respect to the carrying member 22, each blade exerts a true draw-cut which extends from the beginning to the end of the sweep of each blade in a cutting direction. The dotted line illustrations in Fig. 3 clearly show the progress of the blades in the cutting direction and further show that the one corner of each blade 24 is not forced or pushed into the fabric which would tend to quickly dull the same, but cuts cleanly into the same in true draw-cut fashion. This results not only in cutting the material cleanly and uniformly, but also serves to preserve the cutting edges of the blades for a maximum period of time.

As the cam 36 continues to rotate in the indicated direction the nose $a$ thereof will pass the roller $b$ which, under the action of a suitable spring $34^b$ located, for instance, as indicated in Fig. 3, will move down the same and thus actuate the parts in a reverse direction whereby the cutting blades 24 will be moved back to the dotted position in Fig. 3, out of the path of the fabric $h$ which is, accordingly, fed along in a predetermined step ready for the next cut.

Upon completing its described movement the cam 36 will, by the action of the pinion 53, rack 58 and associated parts, commence a return movement in the opposite direction. This will finally bring the bevel $e$ of the cam 36 into engagement with the bevel $f$ of the roller $b$ and accordingly, as the cam continues to rotate, will exert a camming action upon said roller whereby the latter will be moved along the axle $c$ against the tension of the spring $d$ and out of the path of the cam nose $a$. The latter will accordingly pass to one side of said roller $b$ and thus, during this return movement, will have no effect to operate the cutting mechanism.

The cam nose $a$ is so located and the parts are so arranged and connected that the engagement between said cam nose $a$ and the roller $b$ takes place when the connection 65 between the connecting rod 63 and the gear 66 is midway between dead centre positions. At these points the rack 58 is reciprocated and the pinion 53 is rotated at a maximum speed so that the action of the nose $a$ upon the roller $b$ is rapid and the cutting action and the movement of recovery is performed in a minimum of time. This arrangement, in the case of cutting machines of the type illustrated, permits the material being cut to be fed a maximum distance between cuts so that it is possible to cut relatively wide sections of material as well as sections of any intermediate size.

It will be understood that the cutting blades 24 are so located upon the carrying member 22 that the cut of each blade extends into and overlaps that of the next contiguous blade, with the result that the combined action of said blades results in a continuous cut of sufficient length to sever the material into the desired sections. Because of the compound sliding and pivotal movement previously referred to, each blade 24 is carried over a relatively long shallow curve which intersects the material to be cut and whereby each blade cuts into the material, in contradistinction to being pressed or pushed therethrough; the cutting edges accordingly remain sharp for a maximum period of time.

As illustrated in Figs. 7 and 8, the cutting means comprises a support 10 which may also be constructed in the form of a beam having a rear flange 11 and a front flange 12; a cover 13 may also be secured in any suitable manner upon the rear flange 11 and is also formed with a flange 14, which, together with the front flange 12, forms a slot 15 extending lengthwise of said beam 10, as shown in Fig. 7. In this tion of the active cutting edges $k'$ of the blades $24^a$ with respect to the member $22^a$, the cutting action thereof is also in the nature of a true draw-cut whereby the fabric is cleanly severed without rough edges; the location of the cutting blades $24^a$ with respect to each other is such, in this form also, that the cut of one blade extends into and beyond the beginning of the cut of the next adjacent blade so that the action of the combined blades here also results in a continuous cut of sufficient length to completely cut the material $h$ into predetermined sections. In any case, the arcs in which the operative movement of the cutting means takes place extend in the direction of the cut which, in the present instance, is transverse to the direction of travel or feed of said material $h$.

As the mechanism continues in operation the rack 58 and pinion 53 will be rocked in the reverse direction and will similarly actuate the cam $36^a$ whereby the roller $b'$ will travel from the section $a^2$ of the cam groove $36^b$ back into the section $a'$ thereof. This will cause a pull to be exerted upon the yoke $35^a$ and rod $34^a$, which will be communicated to the lever $31^a$ and cause it to return the carrying member $22^a$ back to the dotted line position in Fig. 7, in which the blades $24^a$ are in an inoperative position, out of the path of the material $h$.

With both forms of cutting device installed in a machine as herein described, the material $h$ is clamped over the slot 15 by the clamping member 68 during the cutting operation and is released as soon as the cut has been completed; this not only holds the material $h$ in the best manner to be cut but also permits the cut sections to be removed and the material $h$ to be advanced in the predetermined steps. The operation of the clamping member 68 is effected at the proper time through the medium of the cam 82, rocking member 80 and rod 79 whereby the member 75 and its rack 74 actuate the segment 73, shaft 72 and arms 71 in proper co-ordination with the rest of the machine.

With the arrangement described with respect to Figs. 7, 8 and 9 the operative movements of the cutting means are required to be also only of slight extent and are rapidly performed so that the successive feeding steps of the material to be cut may, as previously stated, be of maximum length. In other words, during the major portion of the rocking movements of the cam $36^a$, the roller $b'$ is in the section $a'$ of the cam groove $36^b$, which section is concentric with the axis of rotation of said cam so that the cutting devices are consequently held in an inoperative position while the operative cutting movements which return to such inoperative position are quick and of short duration, that is to say, during the time the roller $b'$ travels into and back out of the section $a^2$ of said cam groove $36^b$.

Because of the fact that the cut, particularly when the same is made up of a series of short cuts, is a true draw-cut in which the material is cleanly severed, in contradistinction to being ripped, as it were, ragged edges are avoided and the cutting edges of the respective cutting devices remain in a serviceable condition for a maximum period of time. When finally the cutting edges in use do become dull, the cutting blades 24 or $24^a$ or any of them may be easily reversed to bring the opposite cutting edge thereof into use. The ready removal and interchangeability of these cutting members further make it possible to substitute new blades when those in place or any of them have become dulled at both edges.

The cutting mechanism is simple in construction and operation and avoids the necessity for operating the cutting member over a long operative path and equally long return path, as has heretofore been the case. The time intervals between cuts may, therefore, be such that the fabric may be advanced in steps of maximum extent whereby, as previously stated, the dimensions of sections which may readily be cut extend over a considerable range.

While we have shown and described the cutting mechanism in combination with a fabric-cutting machine of the type shown in the patent referred to hereinbefore and to which it is specially adapted, it will be understood that it is also capable of being used to advantage with cutting machines of other types in which a continuous cut in a given direction is desired and further that it is adapted for use in many other fields and the illustrated examples and the description thereof are accordingly not to be construed as defining the limits of the invention or its fields of usefulness.

Various modifications in the specific form shown and described may be made within the scope of the claims without departing from the spirit of our invention.

We claim:

1. In a cutting machine, a support for the material to be cut, and cutting mechanism having an operative movement in an arc which passes through the plane in which said material is supported and including a plurality of cutting members cooperating to produce a continuous cut whereby the material is cut into predetermined sections.

2. In a cutting machine, means for feeding the material to be cut at intervals in predetermined steps, cutting mechanism having an operative movement in an arc which passes through the plane of travel of said material in a direction transverse to the direction of feed thereof and means for operating said cutting mechanism in predetermined co-ordination with said feeding means.

3. In a cutting machine, means for feeding the material to be cut at intervals in predetermined steps, a stationary support, cutting mechanism movably mounted thereon and having an operative movement in an arc which passes through the plane of travel of said material in a direction transverse to the direction of travel, means for operating said cutting mechanism in predetermined co-ordination with said feeding means and clamping means whereby the material is clamped against said support during the cutting operation.

4. In a cutting machine, means for feeding the material to be cut at intervals in predetermined steps, a stationary support, a carrying member movably mounted on said support, links connected with said support and said member whereby the latter is reciprocated in circular arcs, a plurality of cutting members carried by said carrying member and cooperating to produce a continuous cut consisting of overlapping individual cuts, means for actuating said carrying member whereby said cutting members are moved coincidentally in individual arcs each of which intersects the plane of travel of the material in a direction transverse to its direction of travel and means whereby the materiial is clamped against said support during the cutting operation.

5. In a cutting machine, means for feeding the material to be cut at intervals in predetermined steps, cutting mechanism having a compound operative movement partly lineal and partly in an arc which passes through the plane of travel of said material in a direction transverse to the direction of feed thereof and means for operating said cutting mechanism in predetermined co-ordination with said feeding means.

6. In a cutting machine, means for feeding the material to be cut at intervals in predetermined steps, a stationary support, cutting mechanism movably mounted thereon and having a compound operative movement partly lineal and partly in an arc which passes through the plane of travel of said material in a direction transverse to the direction of feed thereof, means for operating said cutting mechanism in predetermined co-ordination with said feeding means and clamping means whereby the material is clamped against said support during the cutting operation.

7. In a cutting machine, means for feeding the material to be cut at intervals in predetermined steps, a stationary support, a slide slidably mounted upon said support, cutting mechanism movably mounted on said support and connected with said slide, and means for linearly actuating said slide whereby said cutting mechanism is reciprocated linearly and in circular arcs relatively to said slide in predetermined co-ordination with said feeding means.

8. In a cutting machine, means for feeding the material to be cut at intervals in predetermined steps, a stationary support, a carrying member movably mounted on said support, links connected with said support and said member, a slide slidably mounted on said support and pivotally connected with said links whereby said carrying member is reciprocated linearly and in circular arcs, a plurality of cutting members carried by said carrying member and co-operating to produce a continuous cut consisting of overlapping individual cuts, and means for linearly actuating said slide whereby said cutting members are moved coincidentally in individual arcs each of which intersects the plane of travel of the fabric in a direction transverse to its direction of travel and coincidentally caused to advance in said arcs and means whereby the material is clamped against said support during the cutting operation.

9. The combination of a support, a carrying member, means whereby the carrying member is moved in circular arcs relatively to said support and a plurality of individual cutting devices mounted upon said carrying member and co-operating to produce a continuous cut.

10. The combination of a support, a carrying member, links pivotally connected with said support and said member whereby the latter is moved in circular arcs relatively to said support, and a plurality of individual cutting devices located upon said carrying member and co-operating to produce a continuous cut.

11. The combination of a support, a carrying member, links pivotally connected with said support and said member whereby the latter is moved in circular arcs relatively to said support, and a plurality of reversible cutting blades detachably mounted upon said carrying member and having their active cutting edges inclined with respect thereto, said blades co-operating to produce a continuous cut.

12. The combination of a support, a plurality of individual cutting devices mounted thereon and cooperating to produce a continuous cut consisting of overlapping individual cuts and means for co-incidentally operating all of said cutting devices.

13. The combination of a support, a carrying member, links pivotally connected with said support and said member, a slide slidably mounted upon said support and pivotally connected with said links whereby said carrying member is moved linearly and in circular arcs relatively to said support and cutting means mounted upon said carrying member.

14. The combination of a support, a carrying member, links pivotally connected with said support and said member, a slide slidably mounted upon said support and pivotally connected with said links whereby said carrying member is moved linearly and in circular arcs relatively to said support, and a plurality of individual cutting devices located upon said carrying member and co-operating to produce a continuous cut.

15. The combination of a support, a carrying member, links pivotally connected with said support and said member, a slide slidably supported upon said support and pivotally connected with said links whereby said carrying member is moved linearly and in circular arcs relatively to said support, and a plurality of reversible cutting blades detachably mounted upon said carrying member and having their active cutting edges inclined with respect thereto, said blades co-operating to produce a continuous cut.

In testimony whereof we have hereunto set our hands.

JULIUS WEGNER.
ALFRED E. WEGNER.